April 13, 1926.

J. J. COLLE ET AL 1,580,287

GLASS SUBSTITUTE

Filed March 20, 1924    2 Sheets-Sheet 1

INVENTORS
J. J. COLLE
A. COLLE
BY
ATTORNEY

April 13, 1926.

J. J. COLLE ET AL 1,580,287

GLASS SUBSTITUTE

Filed March 20, 1924    2 Sheets-Sheet 2

TEST MADE
MARCH 1923
—— GLASS SUBSTITUTE
----- COMMON DOUBLE THICK GLASS

INVENTORS
J. J. COLLE
A. COLLE
BY
ATTORNEY

Patented Apr. 13, 1926.

1,580,287

UNITED STATES PATENT OFFICE.

JULES JOSEPH COLLE AND ACHILLES COLLE, OF SUMMIT, NEW JERSEY, ASSIGNORS TO CELLO PRODUCTS INCORPORATED, OF NEW YORK, N. Y., A CORPORATION OF NEW YORK.

GLASS SUBSTITUTE.

Application filed March 20, 1924. Serial No. 700,500.

*To all whom it may concern:*

Be it known that we, JULES JOSEPH COLLE, a subject of the King of Belgium, and a resident of Summit, in the county of Union and State of New Jersey, and ACHILLES COLLE, a subject of the King of Belgium, and a resident of Summit, in the county of Union and State of New Jersey, have invented a new and useful Improvement in Glass Substitute, of which the following is a specification.

This application is in part a continuation of our prior application, Serial No. 571,372, filed June 28, 1922, and assigned to Cello Products Incorporated.

Our invention relates to window glass substitutes and more particularly to a novel and improved article of manufacture which can be utilized in various arts to take the place of window panes and the like, being particularly applicable in the construction of enclosures where light diffusing and heat insulating properties are important factors such as greenhouses, hotbeds, cold frames, poultry houses, chicken coops and the like.

An object of our invention is the provision of an article of manufacture capable of being substituted for window glass since it has many properties in common therewith besides possessing many additional properties not found in window glass.

Another object of our invention is the provision of a glass substitute which renders an enclosure constructed therefrom less subject to temperature changes, thus giving a higher general average temperature, than is obtainable under like conditions had the enclosure been covered with window glass.

Another object is the provision of a glass substitute comprised of a reinforced film which does not materially embed its reinforcing base but enrolls or incases the same to the extent that the strands thereof are protected thereby from corrosion and the like.

Another object of our invention is the provision of an article of manufacture comprised of an infinite number of small surfaces or bodies formed contiguous with the warp and woof of a reticular base, each of said bodies having such a configuration as to substantially constitute a miniature double concave divergent lens, whereby a better diffusion of light is obtained than can be secured with ordinary window glass.

Another object is the provision of a glass substitute which is of light weight, thus permitting the use of a very light framework, and of simple construction.

Another object of the invention is the provision of a glass substitute that besides being light of weight, has great tensile strength and is capable of withstanding shocks and jars.

A more specific object of the invention is the provision of a glass substitute having a metallic reticular base so designed that the relation of the width of the meshes and size of the wire comprising the strands thereof is such that a maximum of transparency and tensile strength is obtained in the product when a given composition of filler material is employed.

Another object is the provision of a transparent fabricated material which may be applied in long sheets or lengths, is weather proof, durable, substantially non-breakable and exceedingly flexible.

A further object is the provision of an article of manufacture comprising a reticular metallic base, the meshes of which are filled with a thin elastic transparent substance having a consistency which causes it to wet and firmly adhere to the adjacent strands of the base material without appreciably embedding or submerging the same.

A further object of our invention is the provision of an article of manufacture comprising a reticular metallic base, the meshes of which are filled with a film having a coefficient of elasticity substantially that of the strands composing said base, so that the film follows the expansion and contraction thereof, thus avoiding the cracking off or fracture of the films which would otherwise result due to atmospheric temperature changes.

A further object is the provision of a substitute for window glass comprised of a reticular metallic base, the meshes of which are filled with thin transparent film of unitary structure and substantially disposed between the surfaces of the strands forming the base material, whereby greater flexibility of the product is obtained than would be afforded if the strands of the base material were appreciably embedded in the filler composition.

A still further object is the provision of an article of manufacture having a filler composition applied in such a manner and of such a character that when dried, there is formed a thin film between each of the meshes of a reticular base, giving the appearance to the finished product of being constituted of a myriad of individual windows set in between the frames formed by the strands of the netting or base material rather than presenting a smooth appearance as would be the case if the base were embedded to the extent of being submerged beneath the outer surfaces of the filler composition.

In the prior art it has been common practice to utilize a wire mesh as a base or reinforcing element in the manufacture of glass in which instance the wire mesh is entirely embedded and the purpose of the same is to lend rigidity and durability to the product. A product of this character is merely a reinforced type or form of ordinary window glass, so fabricated, that it is rendered capable of resisting influences such as great heat, excessive strains, etc., which would be too severe for ordinary glass, and aside from possessing greater mechanical strength, is slightly different therefrom in its physical properties.

It has also been the practice of utilizing double layers of celluloid with a wire mesh interposed therebetween but it has been found that this product does not readily lend itself to be bent or flexed and twisted into different forms and is easily broken. All products of this nature, of which we are aware, have been at best, poor substitutes for common window glass for many reasons, one being they were not sufficiently resistant to the elements as to make them commercially successful.

Again it has been proposed heretofore, to coat a reticular base, such as a wire cloth, either on one or both sides thereof, with a film of transparent material but in such a product no effort was made to impart thereto weather resisting properties, great flexibility, etc.; neither was any special attempt made to impart to a product of this character, the property of being a poor conductor of heat, inasmuch as this attribute had not function in connection with the contemplated uses to be made of the product.

We are not aware of any suggestion in the prior art of coating a reticular metallic base with a solution or lacquer having such a composition, that when dried, it formed a thin, transparent film possessing the characteristics of being resistant to atmospheric conditions, a good heat insulator, durable, exceedingly flexible and capable of withstanding mechanical strains to a high degree; neither do we know of any prior art showing the application of such a product to the construction of greenhouses and like enclosures, where heat insulating, light diffusing, flexibility, lightness in weight, and similar properties were a virtue.

In practicing our invention, we prefer to employ a reticular metallic base, the width of the meshes and size of the wire strands thereof being so designed as to insure maximum transparency and strength of the final product. The composition of the lacquer or filler used to produce, when dried, a thin, tough transparent coating or film between the wire meshes and firmly adhering to the strands of the base material, must be so selected as to not only withstand weather conditions but to possess the property of being a poor conductor of heat which makes the ultimate article specially suitable for specific uses such as greenhouses, poultry houses and the like. We have found that cellulose acetate or cellulose nitrate mixed with a suitable plasticizer and the mixture dissolved in a suitable solvent has given excellent results from the standpoint of producing a coating substance endowed with the above characteristics.

Our invention will be more fully appreciated as the description proceeds and by reference to the accompanying drawings in which, Fig. 1 is an exaggerated plan view illustrating a product made in accordance with our invention;

Figure 1:
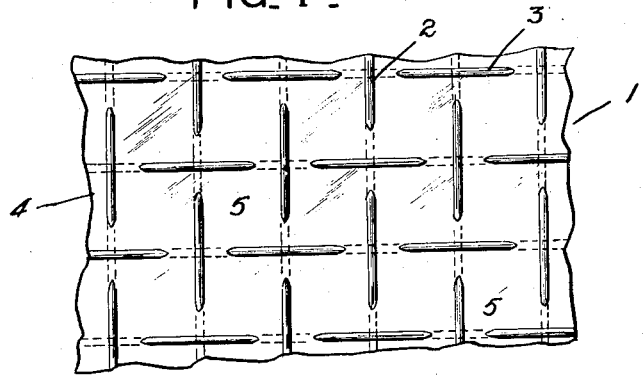

Referring to the drawings, our invention may be practiced by utilizing a reticular metallic base 1 such as a wire netting comprised of warp and woof strands 2 and 3 closely woven, so that when the meshes formed thereby are filled with our composition or lacquer, the resulting product will be a base material covered with a thin transparent coating or film 4 firmly adhering to or wetting said strands.

We have found that there is a critical relation between the size of the strands 2 and 3 and the width of the meshes formed thereby with respect to securing maximum transparency and tensile strength. We have discovered that if the width of the meshes are ten to the inch and the size of the strands are about 10 mils (Roebling gage #34) very satisfactory results are secured, the product having a tensile strength of about one hundred pounds to the inch in width and a transparency of about 83%. If this relation or proportion between mesh and strand size is maintained, corresponding results for different sizes of netting are secured.

The lacquer or ccoating which we use to incase or enroll the strands of the base 1 may comprise a composition consisting of cellulose acetate and a plasticizer, the admixture being dissolved in a suitable solvent. Cellulose acetate has the property of being only slightly inflammable, is a poor heat conductor and as more fully disclosed in a copending application of Adolph Zimmerli, filed of even date herewith, Serial No. 700,733 and assigned to Cello Products Incorporated (also the present assignee), it is the plasticizer which gives the final product its weather resisting properties, causes it to adhere or wet the strands of the base 1, and also governs to a large extent, the elasticity of the film 4 which is formed when the composition is dried. Various plasticizers may be used as, for example, triphenyl-phosphate, ethyl-paratoluolsulphonamide and others. The film formed from this cellulose acetate solution, although only slightly inflammable, may be made substantially non-inflammable, if so desired, by the addition of a suitable ingredient adapted to impart this property, as for example hexachlorethane.

Any suitable solvent may be employed, but one having a low boiling point is preferable inasmuch as this type insures rapid evaporation which is an advantage if it is desirable to recover the solvent where the drying is effected by heat in a closed chamber through which the coated material may be passed, such a form of apparatus being fully disclosed and claimed in a copending application of Adolph Zimmerli, filed December 17, 1923, Serial No. 681,217, solvent recovery apparatus and assigned to Cello Products Incorporated.

Figure 2:
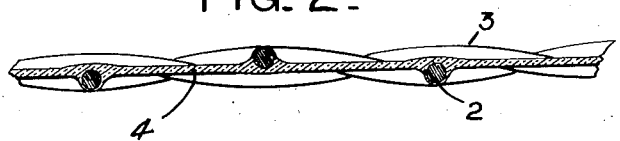
Fig. 2 is a cross-section therethrough.

The cellulose acetate solution may be applied to the metallic base 1 in any suitable manner such as flowed or brushed thereon, but I prefer to use a machine of the type disclosed in the last mentioned Zimmerli application, wherein the wire cloth or netting composing the metallic base 1 is taken off a reel and passed through the coating solution, thence through a saturation and drying chamber respectively, over a system of rolls to insure an even speed or movement through the apparatus and finally rolling it up when dried. As will be appreciated, this manner insures uniformity in the thickness of the resultant film 4, permits the material to be fabricated in rolls of indefinite length, etc. However, in whatever manner the coating or lacquer may be applied, care should be exercised to have its composition of such a consistency as to attach itself in a thin layer to the reticular base material 1, wetting the strands 2 and 3 thereof, and being of such a thickness as to be disposed substantially between the surfaces of the base 1 although completely incasing all portions thereof. When the resultant film 4 is of this nature, the surfaces thereof will be sub-divided by the strands 2 and 3 of the reticular metallic base 1 into substantially individual windows or sections 5 formed intermediate the warp and woof strands and each constitute substantially a double concave divergent body composed of the several portions of the film substantially disposed within and contiguous with the adjacent strands of the base material (see Fig. 2). It will be appreciated that these lens bodies will disperse or deflect the light passing therethrough so as to effect a diffusion of the transmitted light and thus greatly eliminate any shadows which may be formed through the interception of the light by the strands of the reticular base.

Figure 3:
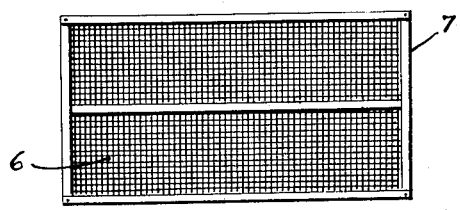
Fig. 3 is a view showing the application of our glass substitute to a frame.

The fabricated or final product, because possessing the qualities of flexibility, toughness, weather-proofness, lightness of weight, etc., besides being a poor conductor of heat, transparent and capable of diffusing the transmitted light, is an excellent material to use in the construction of greenhouses, poultry houses, coldframes, etc. As illustrated in Fig. 3, a sheet 6 of our glass substitute may be readily secured to a coldframe 7 by tacking the edges thereof to the frame by means of staples and covering the same with a strip of light material preferably the same width as the frame material.

Figure 4:
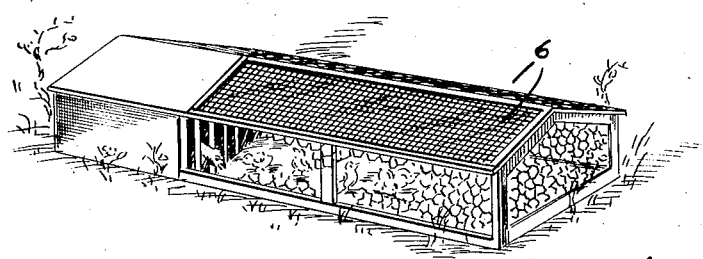
Fig. 4 is a perspective view of our material applied to a chick-and-hen coop.

In the construction of chicken coops or brooder houses, such as shown in Fig. 4, sheets 6 of our material may be fastened to a light framework in any suitable manner. Because of the character of the material, the light is spread evenly, there being no sharp shadows anywhere, with the result that there is less tendency among the chicks to crowd where the light is strongest. There is also less variation in the temperature within the coop or brooder because of the heat insulating capacity of the material.

Figure 5:
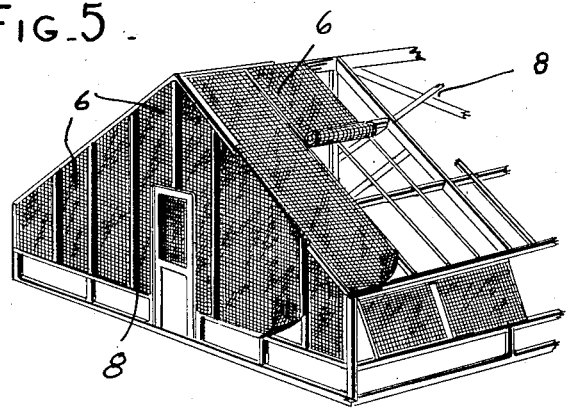
Fig. 5 is a similar view of the material used in the construction of a greenhouse; and, Fig. 6 is a chart showing comparative temperatures which prevailed over the same period of time and conditions under a cold frame constructed of our product and one using common double thick glass.

In applying our glass substitute to the building of greenhouses, such as shown in Fig. 5, it may be put on in long sheets 6 over a light framework 8. Because of the simplicity of construction, most any unskilled person in carpentry may quickly and easily build a greenhouse which will have all of the advantages of an expensive and complicated structure inherent in the use of ordinary window glass for this purpose.

Figure 6:
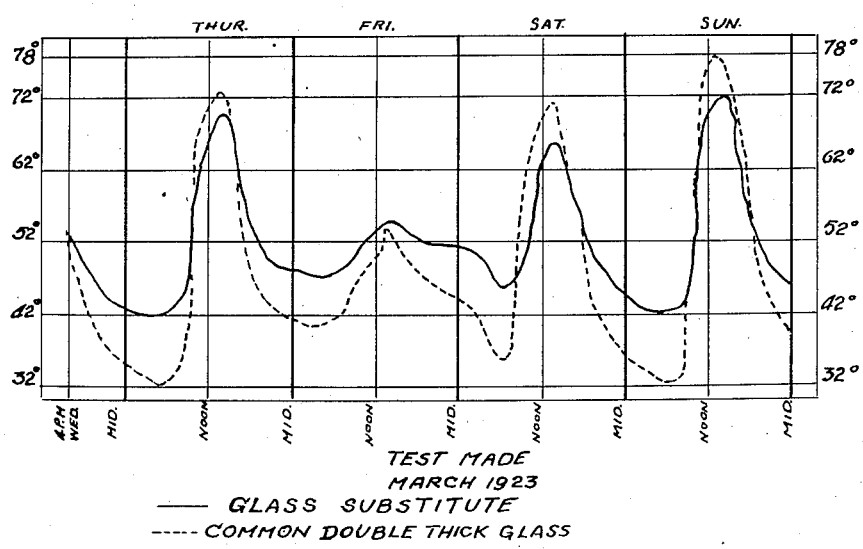

By referring to the chart illustrated in Fig. 6, a good idea will be had of the heat insulating property of our product. A comparative test covering four days and beginning March 28, 1923 of florists' coldframes, one covered with ordinary double thick glass and another with our substitute proved that the temperatures under the frame covered with our product varied less than the temperatures under the glass covered frame, and that the general average temperature was higher under the frame made from our glass substitute. This is evident from an inspection of the curves shown in the Fig. 6.

Besides being a poorer conductor of heat than ordinary glass which is an important factor in the construction of greenhouses and like enclosures, the lightness of weight and tensile strength of our product, are features which make its use very convenient and satisfactory for such purposes. Because of the nature of our material, it is inherently non-shatterable, and for that reason is especially resistant to hailstones and other bodies which may fall thereon. Also, because of the flexibility of our product, it may be secured to any sort of a frame-work in a simple manner and with less difficulty than ordinary window glass.

A further application of our article of manufacture to the art to which it pertains, may be found in mounting a roll thereof upon any suitable reel mechanism, preferably of a portable nature, which will permit the material to be readily rolled and unrolled thereon, so that it could be quickly spread over some uncovered frames within which were growing plants that may be threatened in a given emergency, such as a sudden frost, heavy hailstorm, or the like. By merely unwinding a roll of our glass substitute, it may be laid over such frames until the emergency is past, and then rewound upon the reel mechanism for subsequent use. The flexibility of our glass substitute makes it adaptable for such a purpose, and because of its heat insulating capacity and great tensile strength, serves well to protect the lives of the plants, otherwise exposed to destruction in emergencies, such as mentioned.

As further showing the universal application of our product to the art of horticulture and the like, it is suggested that individual enclosures having various configurations may be constructed therefrom and be of such a character as to be self-supporting, or the material may be draped over a skeleton frame-work and secured thereto in any suitable manner. Such enclosures may function as bells for protecting individual plants when so desired.

From the foregoing, it will be seen that the essence of our invention resides in the fact that we have produced a substitute for window glass which has many properties common therewith but to a greater degree; also that our product has additional properties which not only make it superior to window glass in many respects, but suitable for purposes to which window glass cannot be successfully applied or adapted.

Throughout the specification and claims the film formed upon the metallic base material or fabric has been referred to as being "thin" and as only "slightly incasing" the strands of said material or fabric. By the use of these terms it is wished to be understood to mean that the relation of the thickness of that portion of the film which covers the strands of wire comprising the base is less than the thickness of the general body portion of the film which is substantially disposed within the meshes of the base. By virtue of this relation, the film which incases the strands of wire is less likely to fracture by flexure of the fabric, a better joint or seal is made between the wire strands and the film, etc.

Another term used by us in describing our product is that it is referred to as being "transparent." Strictly speaking our product may be more correctly described as being translucent, inasmuch as it is pervious to light, but it is difficult to distinguish objects through when viewed at a distance. On the other hand sufficient light is transmitted so that objects close up may be distinctly seen or easily recognized. However, since the words "transparent" and "translucent" may be used synonymously, and are given in the dictionary as synonyms, we have chosen to describe our product as being "transparent," but use this term in the light of the foregoing explanation.

While our invention has been set forth in several modifications, it will be understood that others may be made by those skilled in the art without departing from the spirit and scope thereof. For example, other compositions or lacquers may be found for coating the fabric or material other than those suggested and because of their inherent properties, will be especially valuable for such use, but all such modifications are desired to be regarded as contemplated by the invention as defined in the appended claims.

What is claimed is:

1. An article of manufacture comprising a reticular metallic base covered with a flexible transparent film adapted to wet the strands of said base and follow the expansion and contraction thereof, the thickness of said film being such that the outlines of the meshes of the base are substantially preserved in the surfaces of the film, whereby said surfaces are substantially divided into sections corresponding in number and general design to the meshes of the base.

2. An article of manufacture comprising a reticular metallic base covered with a flexible transparent film adapted to wet the strands of said base and follow the expansion and contraction thereof, the thickness of said film being such that each of the surfaces thereof are substantially divided by the strands of the base into sections disposed within the meshes thereof and correspond in number and general design to the configuration of said meshes.

3. An article of manufacture comprising a reticular metallic base covered with a flexible transparent film adapted to wet the strands of said base and follow the expansion and contraction thereof, said film being substantially divided into sections corresponding in number and configuration to the meshes of said base, the shape of each of said sections being substantially that of a divergent lens, whereby a diffusion of the light passing therethrough is effected.

4. An article of manufacture comprising a reticular metallic base covered with a flexible transparent film adapted to wet the strands of said base and follow the expansion and contraction thereof, the thickness of said film being such that the top portions of the strands of the base are barely covered, but at the same time said strands are sufficiently protected by said film as to prevent the corrosion thereof.

5. An article of manufacture comprising a reticular metallic base covered with a flexible transparent film adapted to wet the strands of said base and follow the expansion and contraction thereof, the thickness of said film being such as to only slightly incase the top portions of the strands of said base, and the body portion of said film being substantially disposed in horizontal planes below the top of said strands.

6. An article of manufacture comprising a reticular metallic base covered with a flexible transparent film which wets the strands of said base and follows the expansion and contraction thereof, the thickness of said film being such that the top portions of the strands of the base are merely covered so as to be protected from corrosion, said film also being of such thickness that the strands of the base substantially divide the surfaces thereof into sections corresponding in number and general design to the meshes of said base.

In testimony whereof, we have hereunto subscribed our names this 8th day of March, 1924.

JULES J. COLLE.
ACHILLES COLLE.